United States Patent [19]
Kakinuma et al.

[11] Patent Number: 6,091,172
[45] Date of Patent: Jul. 18, 2000

[54] COIL CONNECTING STRUCTURE IN OUTER ROTOR-TYPE MULTI-POLE GENERATOR

[75] Inventors: Seiichi Kakinuma; Hidetoshi Hirano; Masayuki Tozuka, all of Nitta-machi; Tsutomu Hirano; Motohiro Shimizu, both of Wako, all of Japan

[73] Assignees: Sawafuji Electric Co., Ltd.; Honda Giken Kogyo Kabushiki Kaisha, both of Tokyo, Japan

[21] Appl. No.: 09/158,515

[22] Filed: Sep. 22, 1998

[30] Foreign Application Priority Data

Sep. 29, 1997 [JP] Japan .................................. 9-263643

[51] Int. Cl.⁷ .................................................. H02K 13/00
[52] U.S. Cl. ........................... 310/71; 310/42; 310/67 R; 310/194; 310/254
[58] Field of Search .................................... 310/179, 180, 310/184, 185, 194, 254, 67 R, 71, 42

[56] References Cited

U.S. PATENT DOCUMENTS

| | | | |
|---|---|---|---|
| 4,689,023 | 8/1987 | Strong et al. | 310/DIG. 6 |
| 5,173,628 | 12/1992 | Yoshida et al. | 310/71 |
| 5,268,604 | 12/1993 | Katakura | 310/71 |
| 5,508,578 | 4/1996 | Suzuki et al. | 310/254 |
| 5,635,781 | 6/1997 | Moritan | 310/71 |
| 5,852,335 | 12/1998 | Suzuki et al. | 310/254 |

FOREIGN PATENT DOCUMENTS 9-93849  4/1997  Japan ............................... H02K 3/52

*Primary Examiner*—Elvin Enad
*Assistant Examiner*—Burton Mullins
*Attorney, Agent, or Firm*—Arent Fox Kintner Plotkin Kahn

[57] ABSTRACT

An outer rotor-type multi-pole generator includes a plurality of coils wound around a large number of protruding poles provided around an outer periphery of a stator core through a bobbin, and terminal members fitted into fitting tube portions integrally provided on the bobbin to pass through the stator core over opposite ends of the stator core. Each of the coils is connected to one end of the terminal member. Each of the terminal members includes a flat plate-shaped base portion fitted into the fitting tube portion and a clamping plate portion protruding sideways from one end of the base portion. The end of the coil is connected to the one end of the terminal member by fusing with the clamping plate portion being folded in such a manner that the end of the coil is clamped between the clamping plate portion and one end of the base portion. Thus, the operation for connecting the coils to the terminal members is facilitated, and the number of steps of the connecting operation is reduced.

7 Claims, 11 Drawing Sheets

COIL CONNECTING STRUCTURE IN OUTER ROTOR-TYPE MULTI-POLE GENERATOR

BACKGROUND OF THE INVENTION

1. Field of the Invention

The present invention relates to an outer rotor-type multi-pole generator including a plurality of coils wound around a large number of protruding poles provided around an outer periphery of a stator core through a bobbin, a plurality of fitting tube portions integrally provided on the bobbin to pass through the stator core over opposite ends of the stator core, and a plurality of terminal members made of a conductive metal and fitted into the fitting tube portions with their opposite ends protruding from the fitting tube portions, each coil being connected to one end of the terminal members. The invention particularly relates to an improvement in the structure of connection of the coil to one end of the terminal member.

2. Description of the Related Art

Such an outer rotor-type multi-pole generator is already known from Japanese Patent Application Laid-open No.9-93849 and the like, wherein the coil is connected to one end of the terminal member by soldering.

It is common that a so-called magnet wire with its outer periphery covered with an insulating skin is used as the coil. In an outer rotor-type multi-pole generator designed so that coils are connected to terminal members by soldering as in the above known outer rotor-type multi-pole generator, an operation for peeling off the insulating skin of the magnet wire is required before the soldering, resulting in a complicated operation for connecting the coils to the terminal members and in an increased number of steps of the connecting operation.

SUMMARY OF THE INVENTION

Accordingly, it is an object of the present invention to provide a coil connection structure in an outer rotor-type multi-pole generator, wherein the operation for connecting the coils to the terminal members is facilitated, and the number of steps of the connecting operation is reduced.

To achieve the above object, according to the present invention, there is provided a coil connection structure in an outer rotor-type multi-pole generator comprising a plurality of coils wound around a large number of protruding poles provided around an outer periphery of a stator core through a bobbin, a plurality of fitting tube portions integrally provided on the bobbin to pass through the stator core over opposite ends of the stator core, and a plurality of terminal members made of a conductive metal and fitted into the fitting tube portions with their opposite ends protruding from the fitting tube portions, each of the coils being connected to one end of the terminal member, wherein each of the terminal members includes a flat plate-shaped base portion fitted into the fitting tube portions, and a clamping plate portion protruding sideways from one end of the base portion, and an end of each of the coils is connected to the one end of the terminal member by fusing with the clamping plate portion being folded in such a manner that the end of the coil is clamped between the clamping plate portion and one end of the base portion.

With such arrangement, the ends of the coils are connected in a molten state between the base portion and the clamping plate portion by fusing with the end of each coil clamped between the base portion of the terminal member and the clamping plate portion. Even the coil comprised of a magnet wire can be connected to the terminal members without the operation for peeling off the insulating skin. Therefore, the connecting operation is facilitated, and the number of steps of the connecting operation can be reduced.

The above and other objects, features and advantages of the invention will become apparent from the following description of the preferred embodiment taken in conjunction with the accompanying drawings.

BRIEF DESCRIPTION OF THE DRAWINGS

FIGS. 1 to 9 show an embodiment of the present invention, wherein

FIG. 1 is a vertical sectional view of an outer rotor-type multi-pole generator;

FIG. 2 is a plan view of a stator taken in a direction of an arrow 2—2 in FIG. 1;

FIG. 3 is a sectional view taken along a line 3—3 in FIG. 2;

FIG. 4 is a circuit diagram of connection of main coils;

FIG. 5 is a circuit diagram of connection of DC coils;

FIG. 6 is a circuit diagram of connection of a control power source coil;

FIG. 7 is a circuit diagram of connection of an igniting coil;

FIG. 9 is an enlarged view of an essential portion shown in FIG. 3 during a coil connecting operation;

DETAILED DESCRIPTION OF THE PREFERRED EMBODIMENTS

Figure 1:
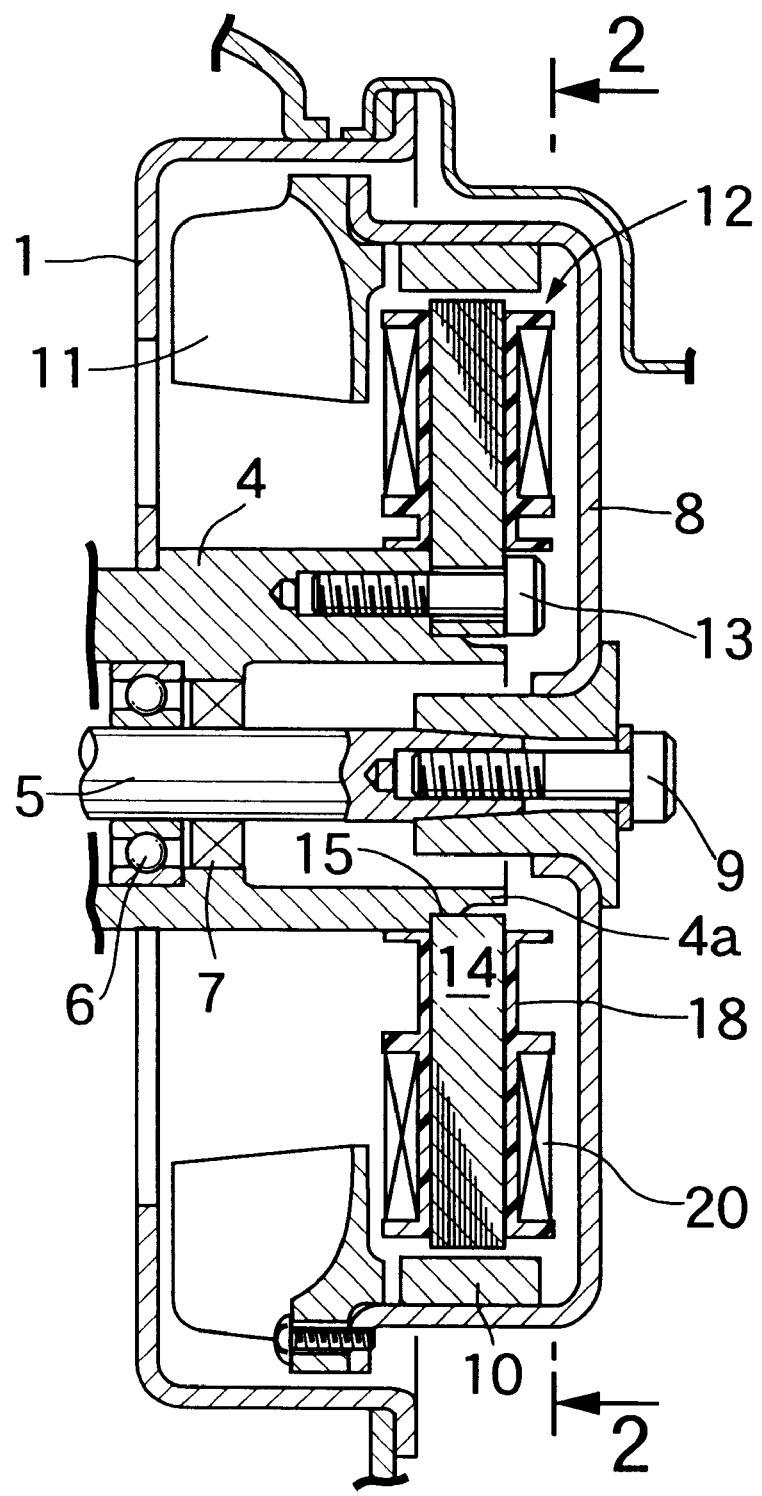

The present invention will now be described by way of an embodiment with reference to FIGS. 1 to 9. Referring first to FIG. 1, a sleeve 4 is fixed to a casing 1 of an outer rotor-type multi-pole generator, with a portion thereof protruding into the casing 1. A crankshaft 5 of an engine (not shown) is coaxially disposed in the sleeve 4 with a bearing 6 and an oil seal 7 interposed between the crankshaft 5 and the sleeve 4. A rotor yoke 8 formed into a bowl shape is coaxially fastened to an end of the crankshaft 5 by a bolt 9. A magnet 10 is secured to an inner periphery of the rotor yoke 8, and a cooling fan 11 is secured to an outer peripheral edge of the rotor yoke 8.

A stator 12 is fixed to an end of the sleeve 4 by a pair of bolts 13. The magnet 10 mounted on the rotor yoke 8 coaxially surrounds the stator 12 to define a small air gap between the magnet 10 and the stator 12.

Figure 2:
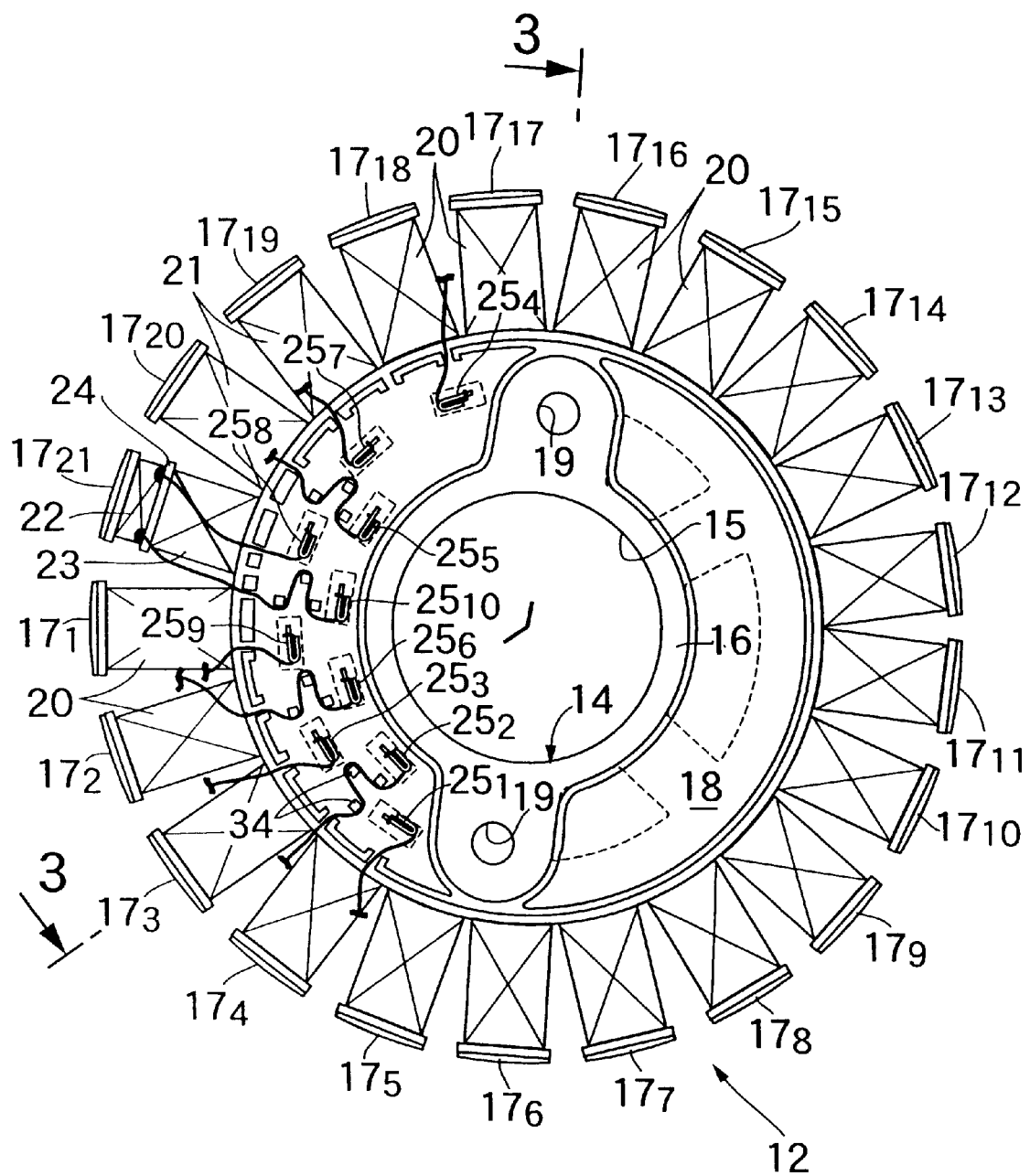
Figure 3:
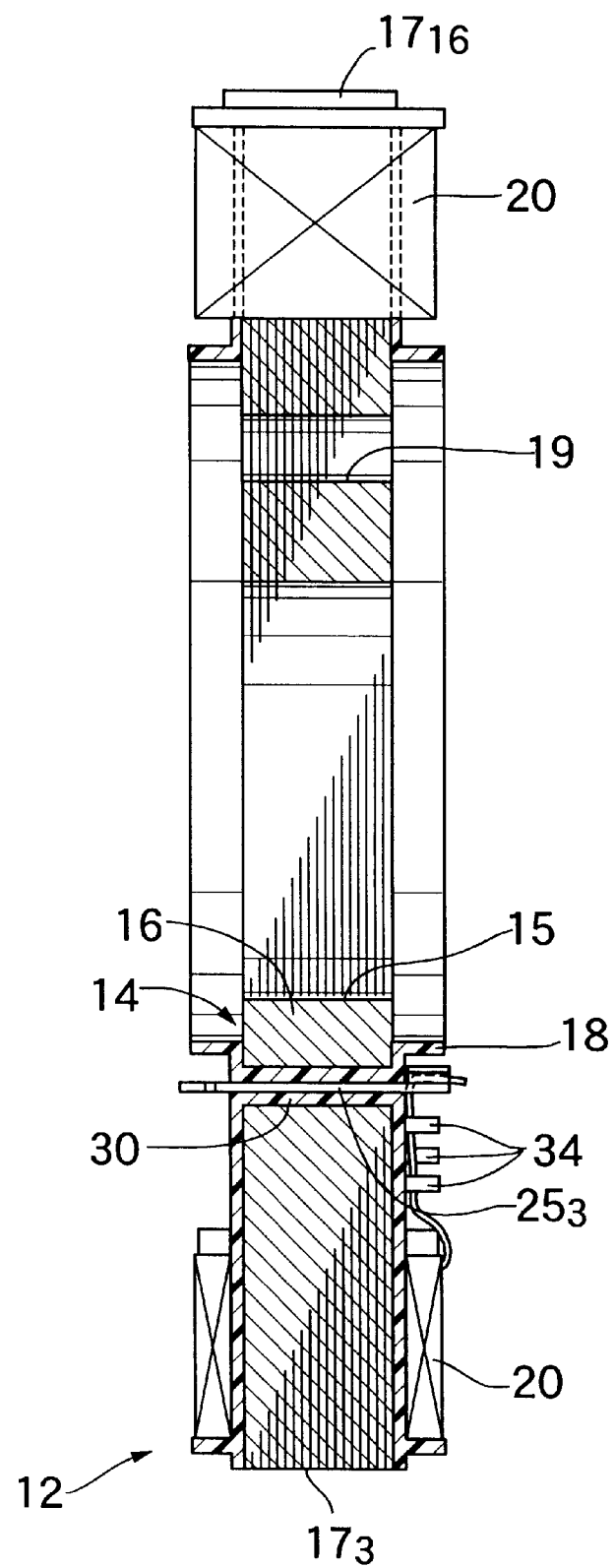

Referring also to FIGS. 2 and 3, the stator 12 has a stator core 14 formed from a plurality of core plates laminated one on another. The stator core 14 of the stator 12 comprises first to 21st protruding poles $17_1$ to $17_{21}$ formed into a substantially T-shape and projectingly provided at distances apart from one another on an outer periphery of a core base portion 16 which is formed into a disk shape to have, at a central portion, a fitting bore 15 into which a cylindrical projection 4a provided at the end of the sleeve 4 is fitted.

The plurality of core plates constituting the stator core 14 are retained in a mutually laminated state because they are partially covered with a bobbin 18 made of a synthetic resin over opposite ends in a laminating direction. The bobbin 18 is formed so as to cover the stator core 14 over axially opposite ends thereof in such a manner that a central portion of the core base portion 16 (including points at which are disposed a pair of mounting bores 19 through which the pair of bolts 13 for coupling the stator core 14 to the sleeve 4 are inserted) and tip ends of the first to 21st protruding poles $17_1$ to $17_{21}$, are exposed.

In such stator core 14, main coils 20 are wound around eighteen $17_1$ to $17_{18}$ of the first to 21st protruding poles $17_1$ to $17_{21}$ through the bobbin 18, respectively; DC coils 21 are wound around the 19-th and 20-th protruding poles $17_{19}$ and $17_{20}$ through the bobbin 18, respectively; and a control power source coil 22 and an igniting coil 23 are wound around the 21st protruding pole $17_{21}$ through the bobbin 18. Moreover, a partition plate portion 24 for partitioning the control power source coil 22 and the igniting coil 23 from each other is integrally formed on the bobbin 18 at a location corresponding to the 21st protruding pole $17_{21}$.

Figure 4:
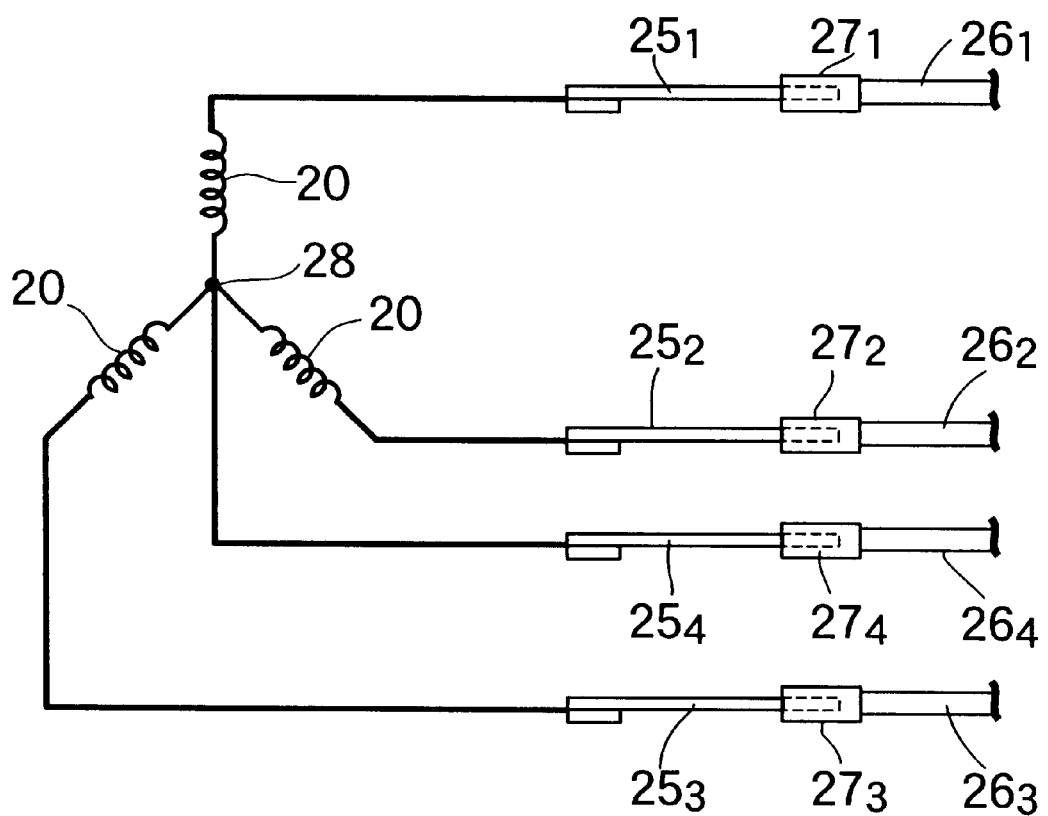

Referring to FIG. 4, the main coils 20 corresponding to the first to 18-th protruding poles $17_1$ to $17_{18}$ serve to provide an AC power of three phases: a U-phase, a V-phase and a W-phase, and are divided into three sets each comprising six poles. One end of each set of the main coils 20 is connected to one end of each of three terminal members $25_1$, $25_2$ and $25_3$, and connectors $27_1$, $27_2$ and $27_3$ individually connected to lead wires $26_1$, $26_2$ and $26_3$ are connected to the other ends of the terminal members $25_1$, $25_2$ and $25_3$. A neutral point 28, at to which the other ends of each set of the main coils 20 are connected together, is connected to one end of the terminal member $25_4$, and a connector $27_4$ connected to a lead wire $26_4$ grounded is connected to the other end of the terminal member $25_4$.

Figure 5:
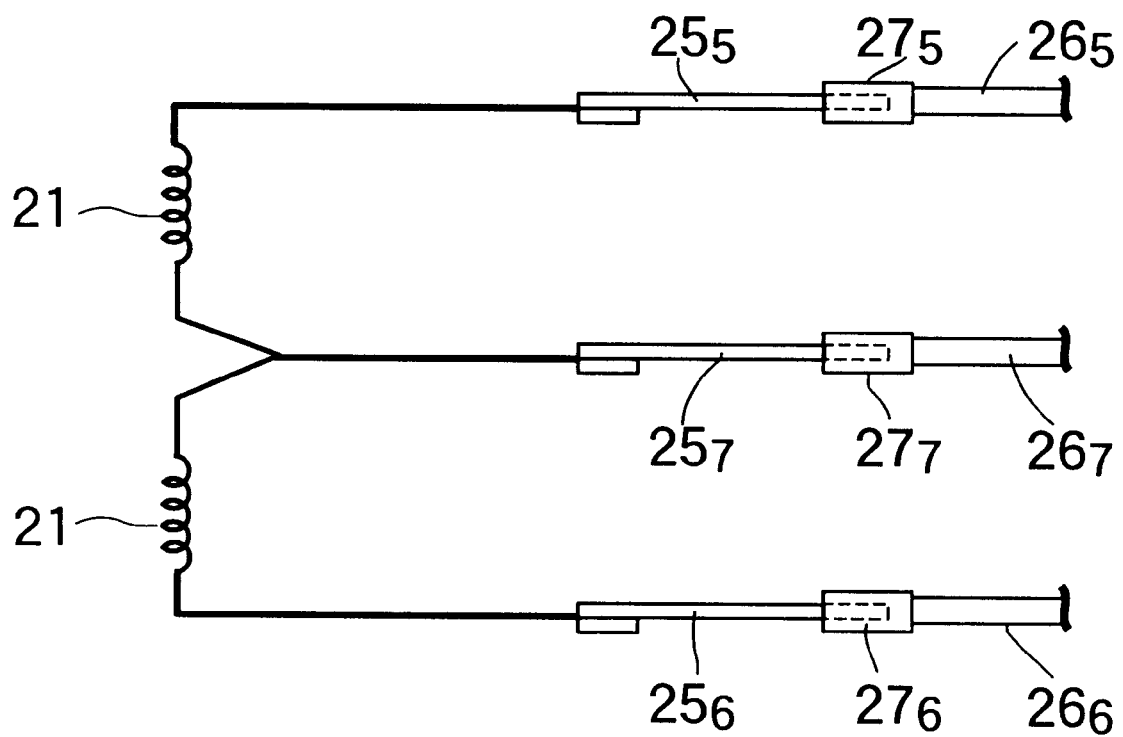

Referring to FIG. 5, DC coils 21 corresponding to the 19-th and 20-th protruding poles $17_{19}$ and $17_{20}$ serve to provide DC power for charging, for example, a battery by rectification thereof. One end of each of the DC coils 21 is connected to one end of each of terminal members $25_5$ and $25_6$, and connectors $27_5$ and $27_6$ connected to lead wires $26_5$ and $26_6$ are connected to the other ends of the terminal members $25_5$ and $25_6$, respectively. The other ends of the DC coils 21 are commonly connected to one end of a terminal member $25_7$, and a connector $27_7$ connected to a lead wire $26_7$ is connected to the other end of the terminal member $25_7$.

Figure 6:
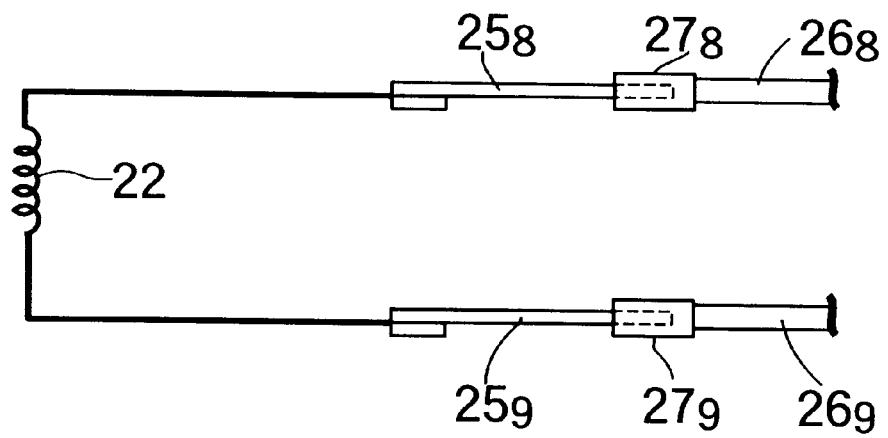
Figure 7:
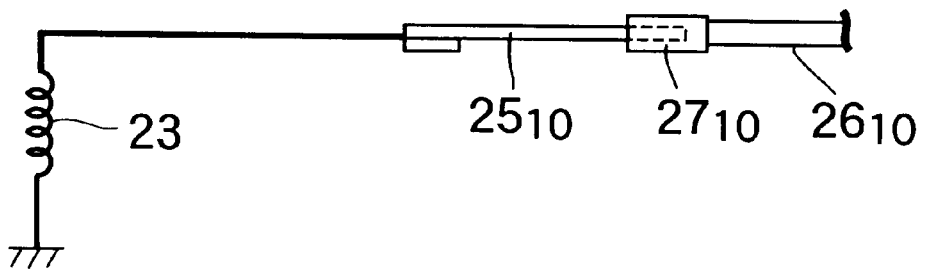

Referring to FIG. 6, opposite ends of the control power source coil 22 are connected to one ends of terminal members $25_8$ and $25_9$, respectively, and connectors $27_8$ and $27_9$ connected to lead wires $26_8$ and $26_9$ are connected to the other ends of the terminal members $25_8$ and $25_9$, respectively. Further, as shown in FIG. 7, the igniting coil 23 grounded at one end is connected at the other end to one end of a terminal member $25_{10}$, and a connector $27_{10}$ connected to a lead wire $26_{10}$ is connected to the other end of the terminal member $25_{10}$.

Referring again to FIG. 3, ten fitting tube portions 30 are integrally provided on the bobbin 18 to pass through the core base portion 16 over its opposite ends, so that each of them has a rectangular cross section. Each of the terminal members $25_1$ to $25_{10}$ is fitted into each of the fitting tube portions 30 in such a manner that opposite ends thereof protrude to opposite sides from each of the fitting tube portions 30.

Referring to FIG. 8, each of the terminal members $25_1$ to $25_{10}$ is made of a conductive metal. Each of the terminal members $25_1$ to $25_{10}$, in a state in which it is not connected to each of the coils 20 to 23, is formed into a substantially L-shape and includes a flat plate-shaped base portion 25a fitted into the fitting tube portion 30, a clamping plate portion 25b protruding sideways from one end of the base portion 25a, and a connector terminal portion 25c connected to the other end of the base portion 25a for connection with each of the connectors $27_1$ to $27_{10}$. A connecting bore 31 is made in the connector terminal portion 25c. The clamping plate portion 25b is capable of being folded toward the base portion 25a, and engage recesses 32 and 33 engageable with ends of the coils 20 to 23 are provided in a connection between the clamping plate portion 25b and the base portion 25a and in an end edge of the base portion 25a. The engage recesses 32 and 33 are formed, so that when the clamping plate 25b is folded, sufficient opposed areas can be ensured in one end of the base portion 25a and the clamping plate 25b.

Figure 8A:
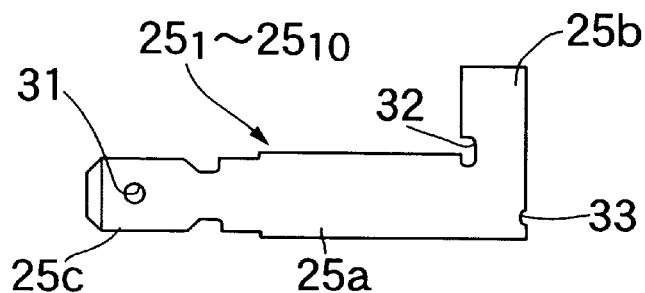
FIGS. 8a to 8d are side views of a terminal member showing the process of connecting the terminal member to the coil.
Figure 8B:
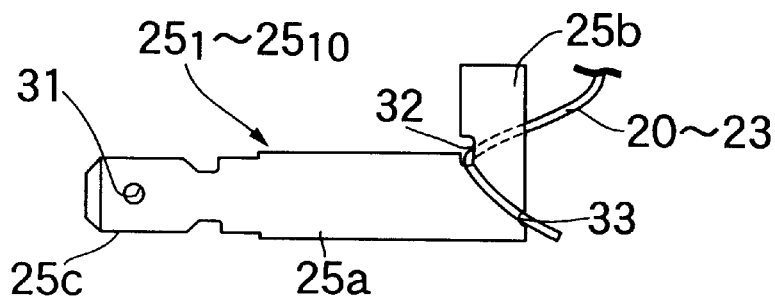
Figure 8C:
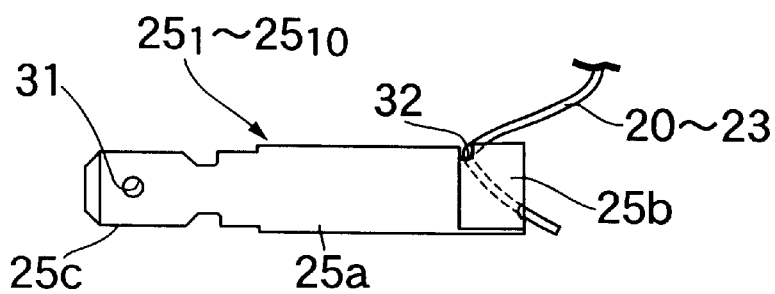
Figure 8D:
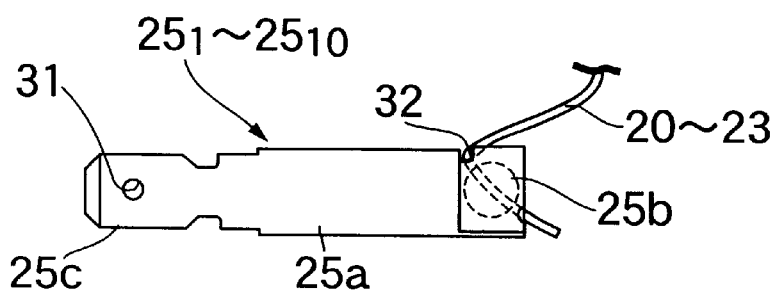
Figure 9:
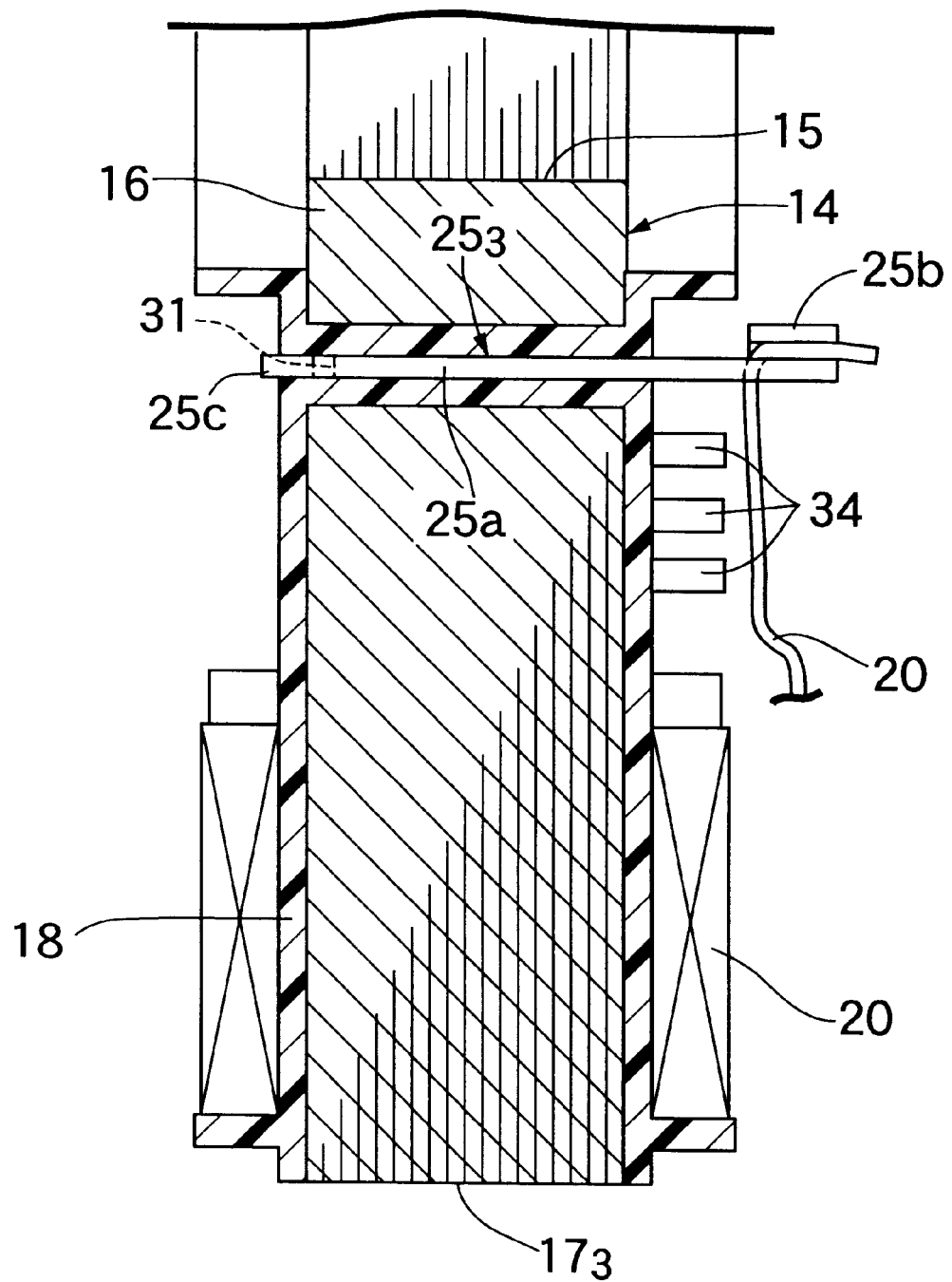

In connecting the ends of the coils 20 to 23 corresponding to the terminal members $25_1$ to $25_{10}$, the terminal members $25_1$ to $25_{10}$ are fitted into the fitting tube portions 30, respectively, as shown in FIG. 9. In this case, each of the terminal members $25_1$ to $25_{10}$ is fitted into each of the fitting tube portions 30 with a relatively large amount of protrusion from the fitting tube portions 30 adjacent one end thereof, i.e., adjacent the clamping plate portion 25b. Thereafter, in a state in which the ends of the coils 20 to 23 have been brought into engagement with the engage recess 32 and 33, as shown in FIG. 8b, the clamping plate portion 25b is folded as shown in FIG. 8c, so that the coils 20 to 23 are clamped between the clamping plate portion 25b and one end of the base portion 25a, or in a state in which the ends of the coils 20 to 23 has been inserted between the previously folded clamping plate portion 25b and the one end of the base portion 25a, while being brought into engagement with the engage recess 32 and 33, the end of each of the coils 20 to 23 is electrically connected to one end of each of the terminal members $25_1$ to $25_{10}$ by fusing, as shown in FIG. 8d, while pressing the one end of the base portion 25a and the clamping plate portion 25b, so that they are moved toward each other.

In a state in which the electric connection of the corresponding coils 20 to 23 to the one end of each of the terminal members $25_1$ to $25_{10}$ has been finished, each of the terminal members $25_1$ to $25_{10}$ is pushed at its one end into each of the fitting tube portions 30. In a state in which the other ends of the terminal members $25_1$ to $25_{10}$ have been protruded from the fitting tube portions 30 and the one end of each of the terminal members $25_1$ to $25_{10}$ have been supported by a jig (not shown) or the like, the connectors $27_1$ to $27_{10}$ are connected in an inserted manner to the connector terminal portions 25c at the other ends of the terminal members $25_1$ to $25_{10}$.

The stator 12 is mounted to the crankshaft 4, so that one end of each of the terminal members $25_1$ to $25_{10}$, i.e., the end to which the end of each of the coils 20 to 23 is connected, faces the rotor yoke 8. When the ends of the coils 20 to 23 connected to the terminal members $25_1$ to $25_{10}$ are flexed toward the rotor yoke 8, there is a possibility that they are brought into contact with the rotor yoke 8. Moreover, the one ends of the terminal members $25_1$ to $25_{10}$, protrude in a relatively large amount from the fitting tube portions 30 when being connected to the coils 20 to 23, and are pushed into the tube portions 30 after completion of the connection to the coils 20 to 23. After completion of the pushing of the one ends of the terminal members $25_1$ to $25_{10}$ into the fitting tube portions 30, there is a possibility that the ends of the coils 20 to 23 are loosened. Therefore, a plurality of projections 34 are integrally provided on the bobbin 18 at a location to cover one end face of the stator core 14. Since the ends of the coils 20 to 23 loosened due to the pushing of the terminal members $25_1$ to $25_{10}$ into the fitting tube portions 30 are wound to the projections 34, respectively, the flexing of the ends of the coils 20 to 23 toward the rotor yoke 8 is avoided, and the rotor yoke 8 is disposed in proximity to the stator 12. Thus, the outer rotor-type multi-pole generator can be made compact.

The operation of the embodiment will be described below. Each of the terminal members $25_1$ to $25_{10}$ includes the flat plate-shaped base portion 25a fitted into the fitting tube portions 30 of the bobbin 18, and the clamping plate portion 25b protruding sideways from one end of the base portion 25a. In the state in which the clamping plate portion 25b has been folded in such a manner that the coils 20 to 23 has been clamped between the clamping plate portion 25b and one end of the base portion 25a, the ends of the coils 20 to 23 are connected to the one end of the terminal members $25_1$ to $25_{10}$ by fusing. Therefore, the ends of the coils 20 to 23 are connected in a molten manner between the base portion 25a and the clamping plate portion 25b. Thus, even if the coils 20 to 23 are formed of a magnet wire, the ends of the coils 20 to 23 can be connected to the terminal members $25_1$ to $25_{10}$ without an operation for peeling off an insulating skin. Therefore, the connecting operation is facilitated, and the number of steps of the connecting operation can be reduced.

Figure 10:
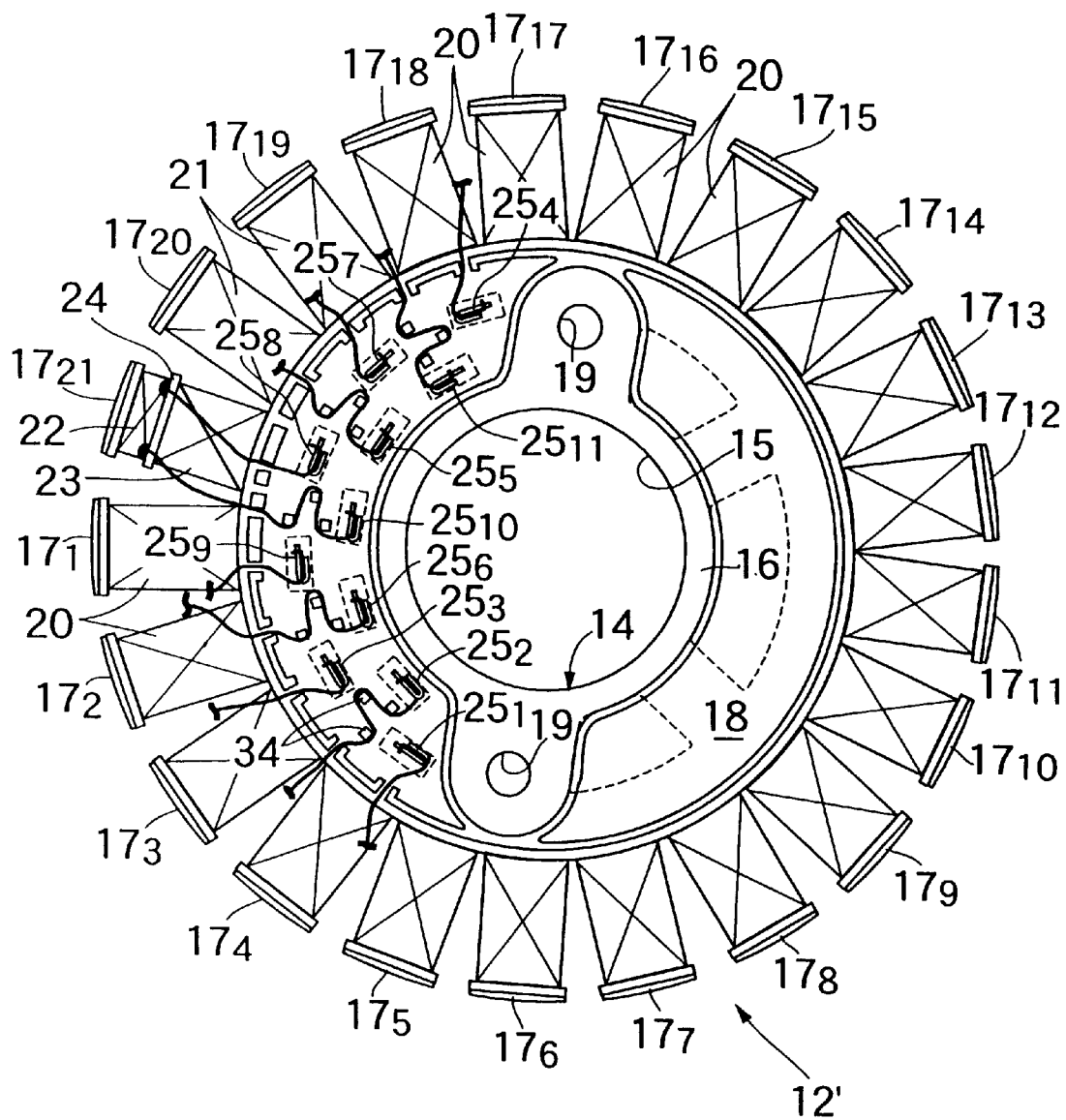
FIG. 10 is a plan view similar to FIG. 2, but according to a modification to a stator.
Figure 11:
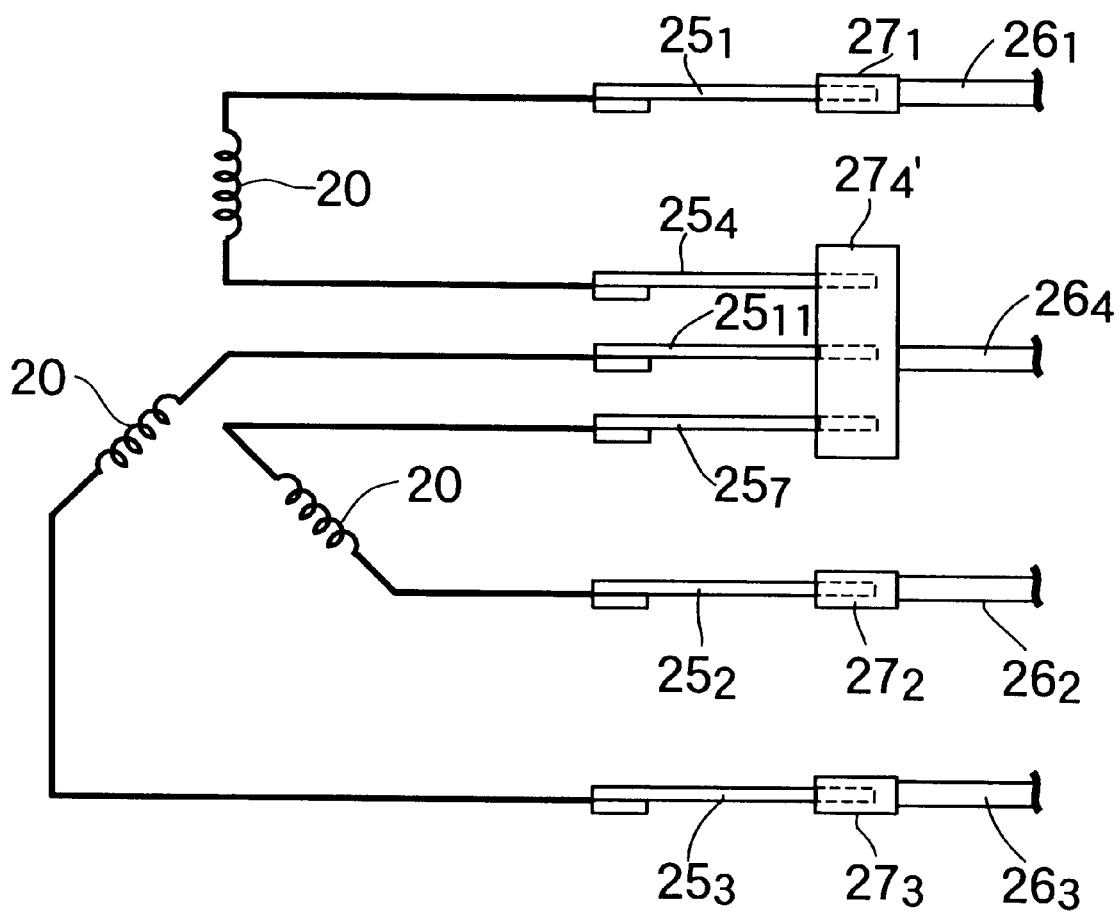
FIG. 11 is a circuit diagram of connection of main coils.
Figure 12:
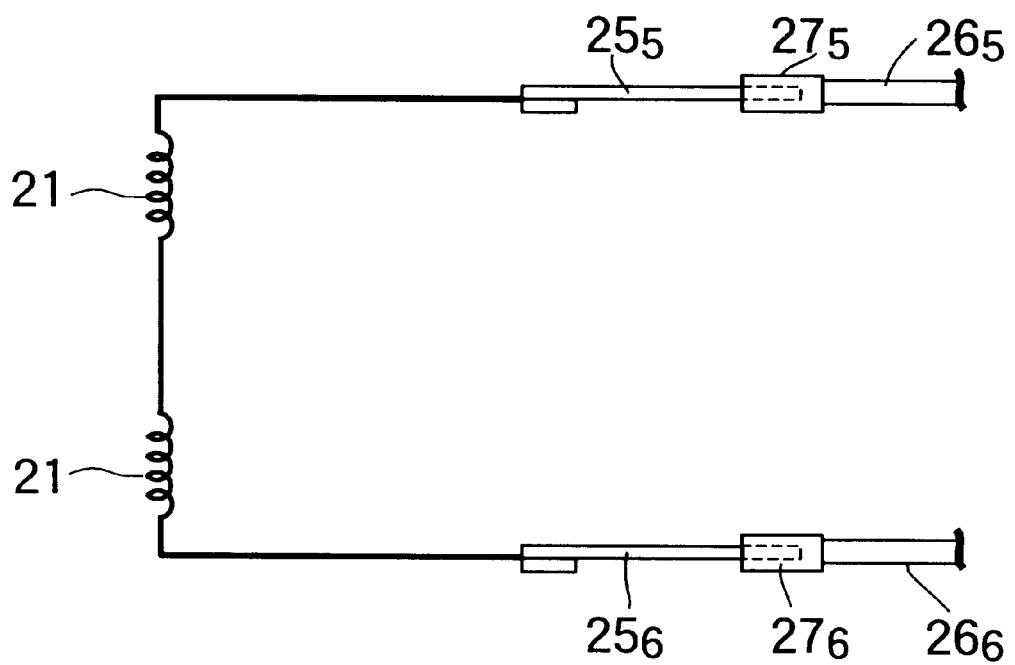
FIG. 12 is a circuit diagram of connection of DC coils.

FIGS. 10 to 12 show a modification to the stator, wherein portions or components corresponding to those in the above-described embodiment are designated by like reference characters.

In this stator 12', eleven fitting tube portions 30 (see FIG. 9) are integrally provided on a bobbin 18 to pass through a core base portion 16 of a stator core 14 over opposite ends of the core base portion 16, so that each of them has a rectangular cross section. Terminal members $25_1$ to $25_{11}$ are fitted into the fitting tube portions 30.

As shown in FIG. 11, one end of each of three sets of main coils 20 each comprising six main coils 20 are connected to one end of each of three terminal members $25_1$, $25_2$ and $25_3$, and connectors $27_1$, $27_2$ and $27_3$ individually connected to lead wires $26_1$, $26_2$ and $26_3$ are connected to the other ends of the terminal members $25_1$, $25_2$ and $25_3$, respectively. The other ends of the main coils 20 of each set are connected to one end of each of terminal members $25_4$, $25_7$ and $25_{11}$, respectively, and a connector $27_4'$ connected to a lead wire $26_4$ grounded is connected to the other ends of the terminal members $25_4$, $25_7$ and $25_{11}$.

As shown in FIG. 12, one end of each of a pair of DC coils 21 is connected to one end of each of terminal members $25_5$ and $25_6$, with the other ends thereof being connected to each other.

Even in this modification, the merits similar to those in the above-described embodiment can be provided.

Although the embodiment of the present invention has been described in detail, it will be understood that the present invention is not limited to the above-described embodiment, and various modifications may be made without departing from the spirit and scope of the invention defined in claims.

What is claimed is:

1. A coil connection structure in an outer rotor-type multi-pole generator comprising a plurality of coils wound around a large number of protruding poles provided around an outer periphery of a stator core through a bobbin, a plurality of fitting tube portions integrally provided on said bobbin to pass through said stator core over opposite ends of said stator core, and a plurality of terminal members made of a conductive metal and fitted into said fitting tube portions with their opposite ends protruding from said fitting tube portions, each of said coils being connected to one end of the terminal member, wherein each of said terminal members is formed of a single piece and includes a flat plate-shaped base portion fitted into said fitting tube portions, and a clamping plate portion protruding sideways from one end of said base portion, and an end of each of the coils is connected to the one end of the terminal member by fusing in a state wherein said clamping plate portion is folded and the end of said coil is clamped between said folded clamping plate portion and said one end of said base portion.

2. The coil connection structure according to claim 1, wherein said outer-rotor type multi-pole generator comprises a rotor yoke of a bowl shape connected to a rotating shaft and surrounding one of said opposite sides of said stator core, said coils being connected to said terminal members at said one of the opposite sides facing said rotor yoke.

3. The coil connections structure according to claim 1, wherein each of said terminal members is provided with coil engaging means for engagement with said coil to hold said coil in place on said terminal member.

4. The coil connection structure according to claim 3, wherein said coil engagement means comprises at least one recess provided around an edge portion of the terminal member.

5. The coil connection structure according to claim 4, wherein said recess is provided at an edge of said one end of said base portion.

6. The coil connection structure according to claim 3, wherein said coil engagement means comprises two recesses provided around an edge portion of the terminal member.

7. The coil connection structure according to claim 6, wherein one of said recesses is provided at an edge of said one end of said base portion and the other of said recesses is provided at a connection between said clamping plate portion and said base portion.

* * * * *